Nov. 24, 1970   JEAN-PIERRE DUFAYET   3,543,145
EDDY CURRENT METHOD AND APPARATUS FOR THE NONDESTRUCTIVE
TESTING OF ELECTRICALLY CONDUCTIVE TUBES UTILIZING
TWO MUTUALLY COUPLED HARTLEY OSCILLATORS
Filed April 29, 1968   2 Sheets-Sheet 1

FIG. I

United States Patent Office 3,543,145
Patented Nov. 24, 1970

3,543,145
EDDY CURRENT METHOD AND APPARATUS FOR THE NONDESTRUCTIVE TESTING OF ELECTRICALLY CONDUCTIVE TUBES UTILIZING TWO MUTUALLY COUPLED HARTLEY OSCILLATORS
Jean-Pierre Dufayet, Aix-en-Provence, France, assignor to Commissariat a l'Energie Atomique, Paris, France
Filed Apr. 29, 1968, Ser. No. 725,100
Claims priority, application France, May 25, 1967, 107,736
Int. Cl. G01r 33/12
U.S. Cl. 324—40             3 Claims

ABSTRACT OF THE DISCLOSURE

Method for the nondestructive testing by eddy currents of electricity conducting tubes, characterized in that, on the one hand, the tube is disposed inside the windings of two Hartley oscillators that are similar, said windings being spaced from each other by a distance small enough for allowing the two oscillators owing to the fact that they are coupled to generate sine waves at the same frequency whatever the characteristics of the tube may be, and, on the other hand, the difference between the potentials $V_{g1}$ and $V_{g2}$, of the grids of the triodes of the two Hartley oscillators, is measured.

---

Figure 1:
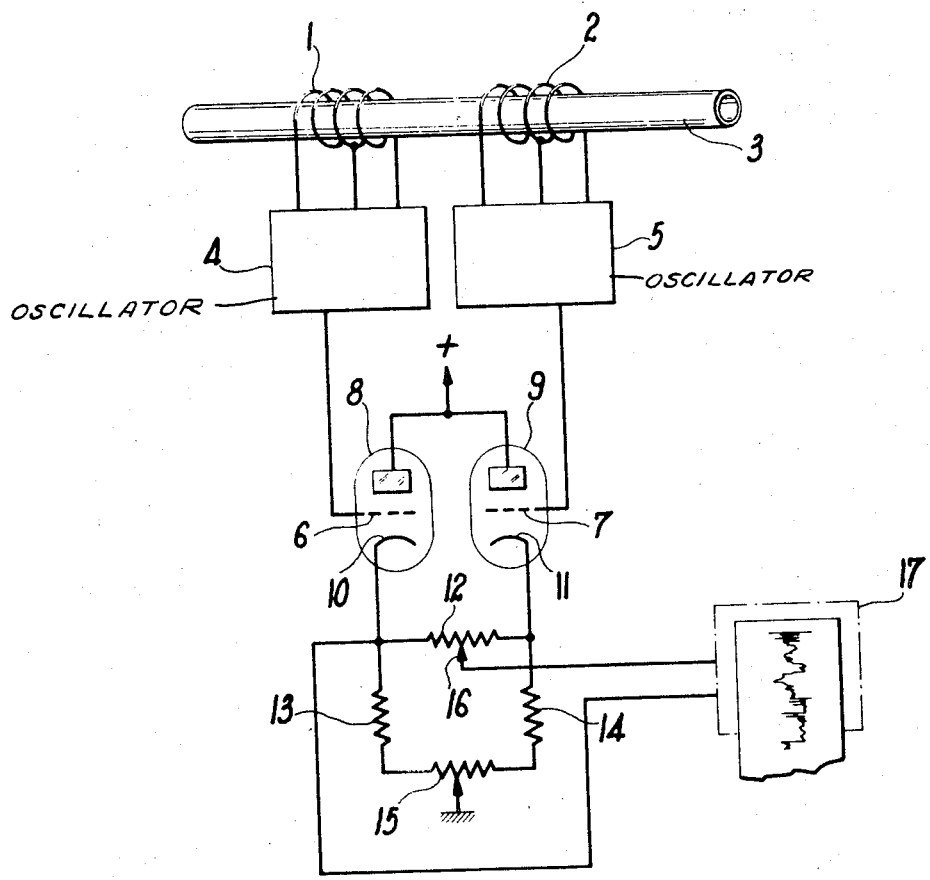

The present invention relates to a method for the non-destructive testing by eddy currents of electricity conducting tubes, and in particular of non-ferromagnetic tubes and of nuclear fuel pins, and to an apparatus for carrying out said processes.

A method described in French Pat. 1,470,386 filed on Jan. 11, 1966 by the applicant, and allowing such a non-destructive testing, is already known, said process being characterized in that on the one hand, the tested tube, subjected to the variable magnetic field of a primary coil inducing eddy currents through it, is disposed inside another coil constituting both the inductance of the oscillating circuit of a so-called Hartley oscillator, and the coil for detecting said eddy currents, or secondary coil and, on the other hand, one measures the potential $V_g$ between the gride of the triode of said device and the earth, said potential being a function of the inductive reactance L and of the ohmic resistance R of said secondary coil, said inductive reactance and said resistance being themselves a function of the effective permeability of the tested tube, which is, in its turn, a function of the physical characteristics of said tube, in relation with the critical frequency relating to said tube, for any given value of the oscillating frequency of the primary coil, so that alterations in the physical constants of the tube (and particularly, faults) are detected by changes in the potential $V_g$ between the gride of the triode and the earth.

In addition, the French patent hereabove mentioned relates to an apparatus for carrying out said method, said apparatus comprising an electronic device, called Hartley oscillator, whose oscillating circuit inductance coil consists of a variable inductance connected in series with the measuring inductance that encloses the tested conducting tube (subjected to an alternating magnetic field) and operates as the coil for detecting the eddy currents induced through said tube by said magnetic field, said Hartley oscillator being provided with a tap for measuring the potential between the grid of the triode and the earth.

The object of the present invention is a method and an apparatus with greatly improved features with respect to the process and apparatus described in the above mentioned patent, particularly with regard to the detection of well-localized faults.

Definitely, the present invention relates to a method for the nondestructive testing by eddy currents of electricity conducting tubes, said method being characterized in that, on the one hand, the tested tube is disposed inside the windings of two Hartley oscillators that are particularly similar, said windings being spaced from each other by a distance small enough for allowing the two oscillators owing to the fact that they are coupled, to generate sine waves at the same frequency whatever the characteristics of the tube to be tested may be, and, on the other hand, the difference between the potentials $V_{g1}$ and $V_{g2}$, of the grids of the triodes of the two Hartley oscillators, is measured.

In addition, the present invention relates to an apparatus for carrying out said method, said apparatus being essentially characterized in that it consists, on the one hand, of two Hartley oscillators that are practically similar and whose winding enclose the tube to be tested and are placed very close to each other, and, on the other hand, of devices for measuring the difference between the potentials of the grids of the triodes of both these oscillators.

Figure 2:
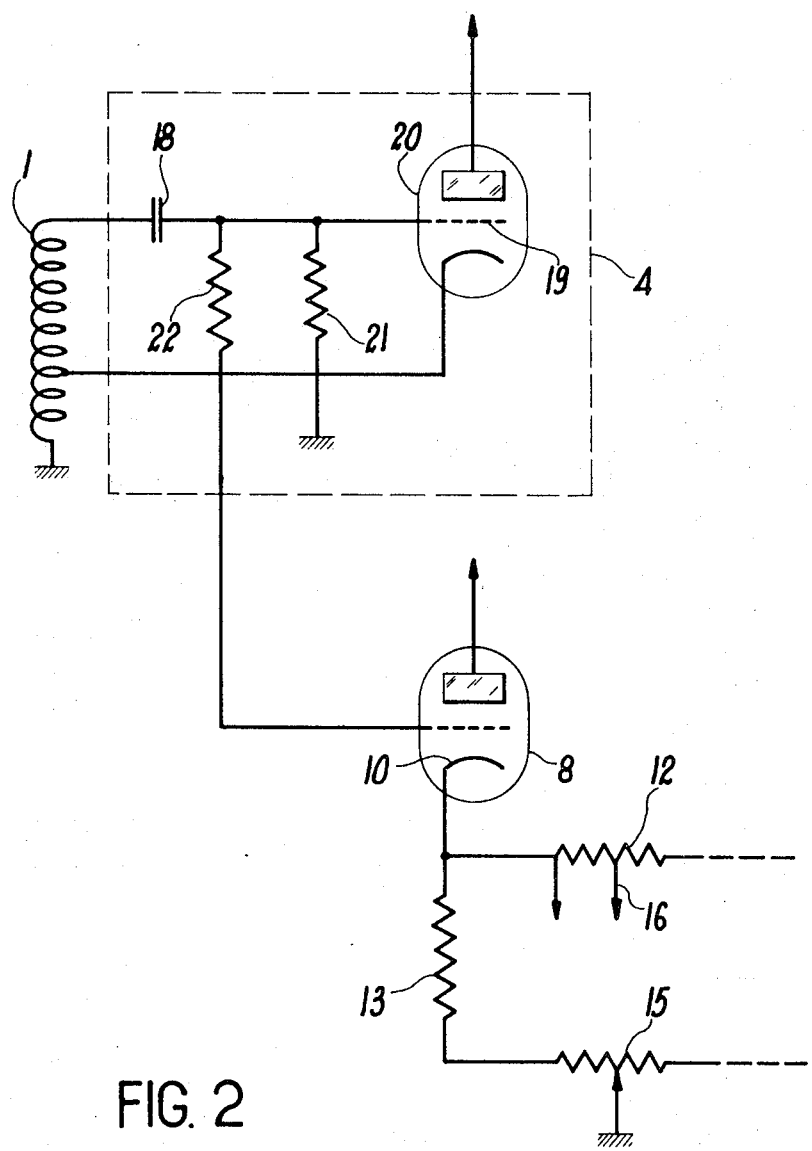

The invention will be now described by way of a non-limitative example, with reference to the accompanying drawings in which:

FIG. 1 is a basic diagram of the electronic circuit constituting the apparatus according to the invention, and FIG. 2 represents, in detail, one of the two Hartley oscillators of the circuit of the FIG. 1.

The circuit of FIG. 1 comprises two windings 1 and 2, respectively, surrounding the tube 3 to be tested and being a part of two oscillators of the Hartley type, diagrammatically shown by the blocks 4 and 5. The grids of the triodes of said oscillators are respectively connected to the grids 6 and 7 of two triodes 8 and 9. The cathodes 10 and 11 of the triodes 8 and 9 are interconnected through a resistor 12; they are connected to the earth through two resistors 13 and 14, respectively, and through a portion of the common balancing resistor 15.

The voltage signal appearing between the tap 16 of the resistor 12 and the cathode 10 is applied to a recording device 17.

In FIG. 2, which shows in detail the oscillator 4, the winding 1 has one of its extremities connected to earth, the other extremity being connected to the grid 19 of the oscillating triode 20 through a capacitor 18.

In addition, the grid 19 is connected, on the one hand, to the earth through a resistor 21, on the other hand, to the grid of the triode 8 through a resistor 22.

The device of FIG. 1 operates as follows: said device consists essentially of two identical windings 1 and 2 surrounding the tube 3 to be tested; they are placed side by side with a distance of about 1 mm. between them. Each winding forms, by itself, a parallel resonant circuit, the oscillations being sustained by a triode. The faults, which change the path of the currents induced through the tube, give rise to changes in the impedance of the winding that affect the frequency and the amplitude of the oscillations.

The distinctive character of said system is the high mutual-inductance factor between the two windings; the coupling factor has such a value that the two oscillators generate sine waves at the same frequency. If a fault appears at the level of the first winding, it affects not only the first circuit, but also the second one owing to the fact that said circuits are coupled.

A high sensitivity in the detection is obtained by comparing the potentials $V_{g1}$ and $V_{g2}$ of each channel. The potential $V_g$ varies with the amplitude so far as the oscillations are quite sinusoidal. It has been established that a fault in the first winding reduces $V_{g1}$ and simultaneously increases $V_{g2}$; therefore, the difference $V_{g1}-V_{g2}$ is subjected to important variations. On the contrary, frequency measurements show that the changes in the frequency of both the coupled oscillators are of the same order of magnitude as those of one oscillator alone. Therefore, it is desirable to take a signal proportional to the amplitude of the oscillations.

The coupling factor is fixed by adjusting the distance between the windings. The sensitivity has the maximum value if the coupling factor is just sufficient for starting the oscillators; if the coupling factor has a higher value, the stability of the circuit is increased, but the sensitivity is reduced. The coupling conditions can be established at will for very different values of the mutual inductance of the two windings.

For improving the resolving power, it is essential to bring the two windings 1 and 2, as close as possible to each other, which may conduce to a reduction of the sensitivity. For harmonizing these two requirements, it is possible to play upon the other components of the oscillators (capacitor 18, resistor 21) in such a manner that the starting limit corresponds to a minimum distance between the two windings.

The circuits is particularly appropriate for detecting well-localized faults (inclusions, cracks) since two quite adjoining parts of the tube are compared; on the contrary, the slow variations due to changes in the sizes (diameter, thickness) are absorbed.

What we claim is:

1. A method for the nondestructive testing by eddy currents of electrically conducting tubes comprising the steps of positioning the grid circuit windings of two practically identical triode tube Hartley oscillators coaxially about said tube to be tested, adjusting the axial spacing between the windings and consequently the mutual inductance therebetween until the oscillators just start oscillating, the high mutual inductance between the windings causing the oscillators to oscillate at the same frequency, and then measuring the difference between the potentials of the grids of the triodes of the two Hartley oscillators while said tube is moved axially through said windings.

2. A method as described in claim 1, including the step of adjusting the circuitry of the respective oscillators while said winding spacing is being adjusted, to enable the windings to be closely positioned while still maintaining the oscillators at the point of initial oscillation.

3. An apparatus for the nondestructive testing by eddy currents of electrically conducting tubes comprising two practically identical triode tube Hartley oscillators each having a grid circuit winding, said windings positioned coaxially of one another about the path to be taken by the tube to be tested and axially closely spaced side by side about the path grids for said triode tubes, a capacitor connected between each of said grids and the corresponding one of said windings, a resistor connected between each of said grids and the corresponding one of said capacitors and connected to groud and means connected to said grids of said oscillators for measuring the difference between the potentials of said grids.

References Cited

UNITED STATES PATENTS

| 3,135,914 | 6/1964 | Callan et al. | 324—40 |
| 3,146,395 | 8/1964 | Quittner | 324—40 |
| 3,273,055 | 9/1966 | Quittner | 324—37 |
| 3,449,661 | 6/1969 | Puidak | 324—40 |

FOREIGN PATENTS

| 907,418 | 10/1962 | Great Britain. |

RUDOLPH V. ROLINEC, Primary Examiner

R. J. CORCORAN, Assistant Examiner